United States Patent [19]

Johnson et al.

[11] Patent Number: 5,665,277

[45] Date of Patent: Sep. 9, 1997

[54] NANOPARTICLE SYNTHESIS APPARATUS AND METHOD

[75] Inventors: D. Lynn Johnson; Vinayak P. Dravid; Mao-Hua Teng; Jonathon J. Host; Jinha Hwang; Brian R. Elliott, all of Evanston, Ill.

[73] Assignee: Northwestern University, Evanston, Ill.

[21] Appl. No.: 557,304

[22] Filed: Nov. 14, 1995

Related U.S. Application Data

[63] Continuation-in-part of Ser. No. 330,326, Oct. 27, 1994, Pat. No. 5,472,749.
[51] Int. Cl.[6] .................................................. B05B 17/04
[52] U.S. Cl. ............................... 264/6; 264/5; 264/10; 425/6
[58] Field of Search ........................... 264/5, 6, 10; 425/6

[56] References Cited

U.S. PATENT DOCUMENTS 4,610,718  9/1986  Araya et al. .............................. 75/0.5

OTHER PUBLICATIONS

Synthesis of Nanostructured Materials by the Use of a Termophoretic Forced Flux System; Scripta Metallurgica, vol. 28, no. 6, pp. 721–724, 1993.
Nanophase Materials Assembled From Atomic Clusters; MRS Bulletin Oct., 1990, pp. 60–67, Richard W. Siegel.
Generation of Molecular Clusters of Controlled Size; Surface Science 106 (1981), pp. 117–124; R.S. Bowles, et al.
Nanocrystalline Materials; Progress in Materials Science, vol. 33, pp. 223–315, 1989, H. Gleiter.
Studies of Ultrafine Particles in Japan: Crystallography. Methods of Preparation and Technological Applications; Progress in Materials Science, vol. 35, pp. 1–96, 1991, Ryozi Uyeda.

*Primary Examiner*—Mary Lynn Theisen
*Attorney, Agent, or Firm*—Edward J. Timmer

[57] ABSTRACT

Method and apparatus for making nanoparticles of a material having a diameter of 100 nanometers or less wherein the material to be formed into nanoparticles is evaporated to form a vapor plume therein, a non-reactive entrainment gaseous atmosphere suitable for evaporation conditions is introduced to a first chamber, a gaseous jet is directed through the vapor plume in a direction to carry nanoparticles formed by quenching of the vapor plume through a flow restriction orifice between the first chamber and a second chamber downstream of the first chamber, recirculation of the gaseous jet and nanoparticles entrained therein from the second chamber to the first chamber is substantially prevented to thereby provide a second stage of the gaseous jet downstream of the orifice and substantially isolated from said first chamber for flow to the second chamber, and collecting the nanoparticles from the second stage of said gaseous jet in a collection chamber downstream from the orifice. The nanoparticles can be reacted in an aerosol reactor chamber located downstream of the orifice under a variety of reaction conditions without adversely affecting the evaporation conditons present in the first chamber.

37 Claims, 5 Drawing Sheets

NANOPARTICLE SYNTHESIS APPARATUS AND METHOD

This application is a continuation-in-part of parent application Ser. No. 330 326 filed Oct. 27, 1994, now U.S. Pat. No. 5,472,749.

CONTRACTURAL ORIGIN OF THE INVENTION

The United States Government has rights in this invention pursuant to National Science Foundation Grant DMR-9202574.

FIELD OF THE INVENTION

This invention relates to production of particulates having nanoparticle dimensions, such as about 100 nanometers diameter or less, and, more particularly, to apparatus and method for producing nanoparticles of metals, alloys, intermetallics, ceramics, and other materials by quench condensation of a high temperature vapor using a two-stage gaseous jet system.

BACKGROUND OF THE INVENTION

Nanoparticles, i.e. particles with physical size (diameter) of about 100 nanometers (nm) diameter or less, possess important technological properties ranging from superior mechanical behavior to novel electronic and magnetic properties by virtue of their nanocrystalline or other nano-scale microstructural features. Unfortunately, nanoparticles, by virtue of their size and high surface area, are very reactive and interact with their surroundings quickly. For example, metal nanoparticles tend to oxidize rapidly when exposed to air. The desirability of the encapsulation of nanoparticles of metals inside graphite shells has been recognized. For instance, magnetic materials (such as metallic nickel, iron, cobalt or cobalt-chromium alloy) encapsulated inside graphite shells can find applications as recording media, ferro fluids or magnetic tagging elements. These nanocapsules may be injected into biological systems for use as a drug or a tracing delivery and monitoring system. These particulate materials may also find applications in electronic and optoelectronic industries by virtue of their small particle size, which could give rise to novel quantum phenomena. The encapsulated nanoparticles may be consolidated or dispersed in a matrix to form interpenetrated composites which will have applications in areas which require better mechanical properties or unique electronic and magnetic properties.

Generally the prior art synthesis methods utilize an arc between two graphite electrodes in which one electrode (the anode) is a mixture of graphite and the material to be encapsulated, and the other electrode (the cathode) is graphite. Such a process generally results in isolated instances of encapsulation with a low yield. Furthermore, the process also produces a lot of empty graphite shells, graphite flakes, amorphous debris and graphite nanotubes which are difficult to separate from those which encapsulate the material of interest.

Other methods suffer from surface contamination by impurities, which can greatly change the desired properties of a bulk sample. The inert gas vapor condensation method is one of the cleanest ways to produce nanophase materials. Because the material is physically evaporated in the absence of any precursors, there are no contaminants left on the surface of the nanoparticles, which eliminates a common problem with chemical methods. However, typically either the particle size is too large, the production rate is too low, or both using these techniques. Heating methods include electrical resistance heaters, arc discharge, laser heating, and electron beam heating. In traditional resistance heated evaporators, the vapor is formed in a partial vacuum above an open crucible or boat and allowed to rise from the molten pool by convection. Low evaporation rates and low pressures are required to yield small particles, resulting in low rates of production of nanoparticles. In the arc heating method, a flow of gas at atmospheric pressure is passed through the arc chamber to carry the condensed particles away from the arc, but the average partice size tends to be substantially large with respect to nanoparticle range; e.g. larger than 20 nm.

The production of oxide nanosize powder particles from metal vapors traditionally has been effected by first collecting the metal nanoparticles and then allowing them to oxidize on the collector. Among other problems, the oxidized particles are agglomerated prior to oxidation such that the oxidized particles likewise are agglomerated after oxidation.

Copending application Ser. No. 330 326 of common assignee herewith describes a method of encapsulating nanoparticles in a graphite shell that overcomes the shortcomings and problems experienced by the prior art discussed hereabove. The method employs a tungsten arc method wherein an arc chamber is filled with an inert or reducing gas and a tungsten rod is used as a non-consumable cathode. The anode comprises the material, such as a metal, alloy, etc., which is to be formed into nanoparticles. The anode material is contained in a graphite crucible and is vaporized by the electric arc established between the anode and the non-consumable cathode. The high temperature vapor of the anode material is rapidly quenched by directing a jet of helium or other inert gas through the electric arc and vapor plume produced thereby. The rapid quenching of the vapor produces nanoparticles coated with graphite that are collected for further processing.

An object of the present invention is to provide for the production of nanoparticles by quench condensation of a high temperature vapor using a two-stage gaseous quenching jet.

A further object of the present invention is to provide for the production of nanoparticles by quench condensation of a high temperature vapor using a two-stage gaseous quenching jet system that, in effect, isolates an upstream evaporation chamber from one or more downstream reaction chambers where the nanoparticles can be reacted (e.g. coated) or otherwise treated in flight under a variety of reaction conditions without substantially affecting the conditions present in the upstream chamber.

Still a further object of the subject invention is to provide for the production of nanoparticles by quench condensation of a high temperature vapor in a two-stage gaseous quenching jet system that permits nanoparticle collection on movable belts or in fluids, if desired.

SUMMARY OF THE INVENTION

The present invention provides method and apparatus for forming nanoparticles of metal, alloy, intermetallic, ceramic, and other materials wherein a gaseous jet is directed in a first chamber in a direction to carry nanoparticles quenched from vapor through a flow restriction orifice between the first chamber and a second chamber downstream of the first chamber in a manner to provide a second stage of the gaseous jet downstream of the orifice and substantially isolated from the first chamber for flow to the second chamber and wherein nanoparticles can be collected from the second stage of the gaseous jet downstream from the orifice.

A particular method embodiment of the present invention involves making nanoparticles of a material wherein a gaseous jet is directed in a first chamber in a direction to carry nanoparticles through a flow restriction orifice between the first chamber and a downstream second chamber, introducing a non-reactive (e.g. an inert or reducing) or reactive entrainment atmosphere in the first chamber, and substantially avoiding recirculation of the gaseous jet and nanoparticles entrained therein from the second chamber to the first chamber effective to provide a second stage of the gaseous jet downstream of the orifice and substantially isolated from the first chamber for flow to the second chamber. The nanoparticles are collected from the second-stage of the gaseous jet at a location downstream from the orifice.

A particular apparatus embodiment of the present invention comprises a first chamber, means in the first chamber for directing a gaseous jet carrying nanoparticles in a direction toward the flow restriction orifice, a second chamber communicated to the first chamber by a flow restriction orifice or opening therebetween, and means for introducing a non-reactive entrainment gaseous atmosphere in the first chamber. The gaseous jet in a first stage entrains a portion of the entrainment gaseous atmosphere in the first chamber to form and entrain the nanoparticles.

The first stage of the gaseous jet is directed from the first chamber to flow through the flow restriction orifice to form a diluted second stage of the gaseous jet on the opposite downstream side of the orifice for flow to the second chamber. The flow rates of the gaseous first stage jet and gaseous entrainment atmosphere introduced to the first chamber as well as orifice size and location relative to the first chamber are controlled such that substantially all of the gas and suspended nanoparticles pass through the orifice without recirculation back to the first chamber, thereby isolating the second stage of the gaseous jet downstream of the orifice from the first chamber. The second stage of the gaseous jet comprises a hot aerosol having the nanoparticles suspended in the first stage of the gaseous jet diluted by entrained gas from the first chamber entrainment atmosphere.

Means is provided for collecting the nanoparticles from the hot second stage of the gaseous jet downstream of the orifice. One embodiment of the invention provides a second chamber having cooled walls to collect the nanoparticles by a thermophoresis effect. For example, a second chamber having one or more vertically oriented, cooled walls on which the nanoparticles collect by the thermphoresis effect can be used. The apparatus may optionally include means for removing the collected nanoparticles from the cooled walls of the second chamber. Such means may comprise a scraper means for dislodging the nanoparticles from the cooled walls and a receptacle communicated to the second chamber and into which the nanoparticles collect. The receptacle typically is communicated to the second chamber via a valved interlock that can be closed off to allow the receptacle to be removed for emptying while nanoparticles are still being collected on the chamber wall from the second stage of the gaseous jet.

The collection chamber optionally may include an endless belt cooled to collect nanoparticles thereon by the thermophoresis effect and means for removing the collected nanoparticles from the endless belt. Alternately, the collection chamber may include a collection belt comprising a suitable substrate material, such as polymeric material, wherein the belt enters the chamber and is cooled to collect nanoparticles and then exits the chamber with the nanoparticles adhered thereto. The belt and nanoparticles remain together with the belt comprising a carrier substrate for the nanoparticles for further processing to end product specifications.

In another embodiment of the present invention, apparatus and method of the present invention further involve an aerosol treatment chamber communicated to the second chamber downstream thereof for receiving all or a portion of the second stage of the gaseous quenching jet. A treating agent such as a reactant (e.g. oxygen, carbon monoxide, borane, and/or other reactive gas or material) may be introduced to the aerosol treatment chamber to treat or react with the nanoparticles in their flight through the aerosol treatment chamber to form a coating or other reaction product. The reaction conditions in the aeorsol treatment chamber, in effect, are isolated from the conditions present in the first chamber as a result of isolation of the second stage of the gaseous jet from the first chamber. The reaction of the nanoparticles thus can be carried out independent of and without substantially affecting the conditions present in the first chamber. For example, an oxidizing gas can be introduced into the aerosol treatment chamber to react with the nanoparticles to form oxide nanoparticles while inert or reducing gas conditions are maintained in the first chamber.

The fraction or portion of the second stage of the gaseous jet that enters the aerosol treatment chamber can be controlled by appropriate positioning of an adjustable outlet conduit of the second chamber and by the temperature of the collection surfaces in the second chamber. For example, a higher wall temperature will result in less thermophoresis collection in the second chamber and a greater fraction of the second stage of the gaseous jet entering the aerosol reactor.

A secondary nanoparticle collection chamber typically is provided downstream from the aerosol treatment chamber in communication therewith to collect the treated nanoparticles. This collection chamber can include a cooled collection wall to collect nanoparticles by the thermophoresis effect. Optionally, the secondary collection chamber can include means for providing a fluid flow curtain or film traveling along the cooled wall(s) to sweep collected nanoparticles to a receptacle in communication with the chamber.

The above and other objects of the present invention will become apparent from the following detailed description of the invention taken with the following drawings.

DESCRIPTION OF THE INVENTION

Figure 1A:
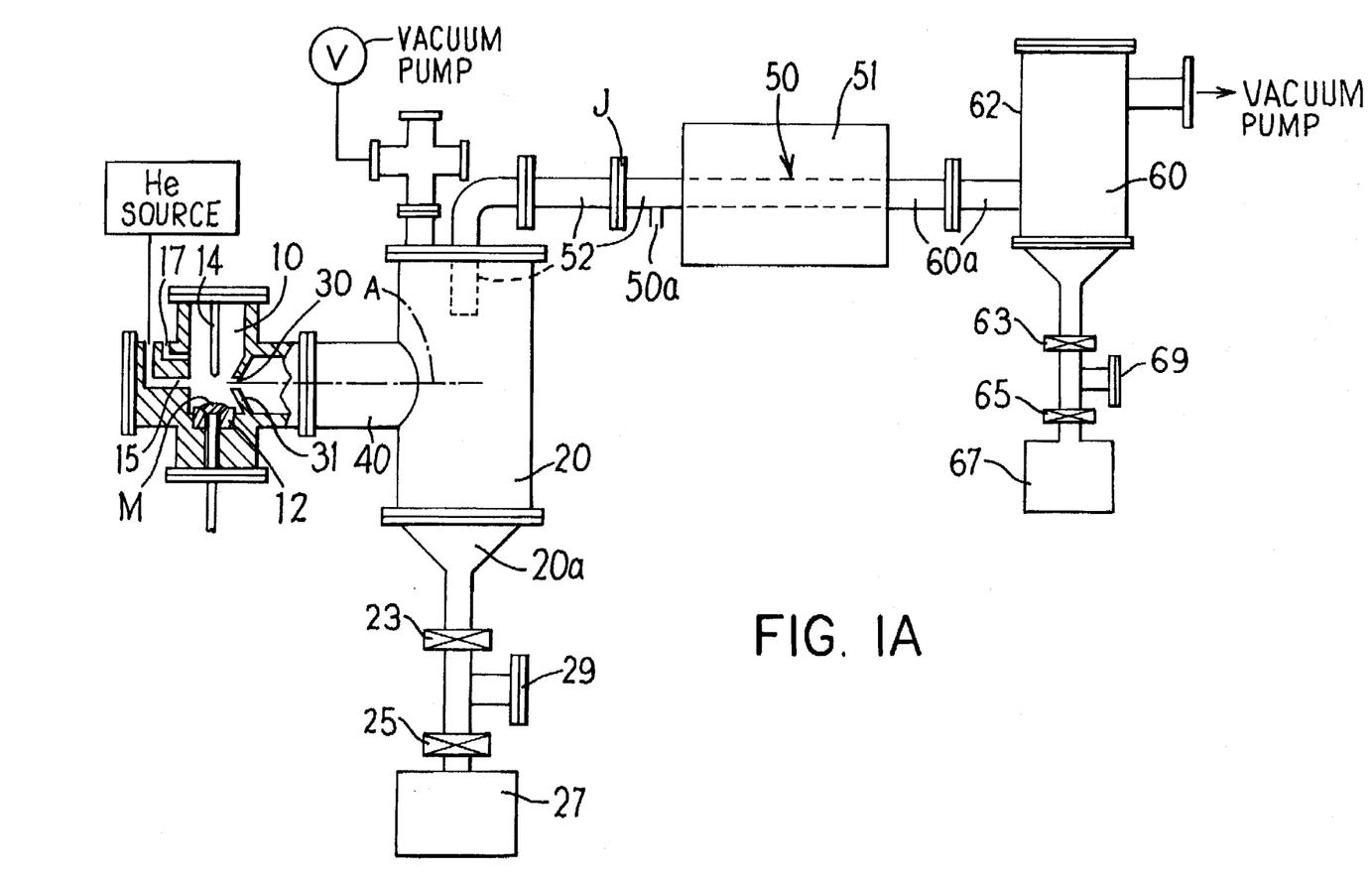
FIG. 1A is a schematic view of apparatus of an embodiment of the invention for making naonparticles with certain chamber housings broken away to reveal inner components.

Referring to FIGS. 1A, B and 2–3, apparatus in accordance with one embodiment of the invention is shown for forming nanoparticles of a material, which may comprise a metal, alloy, intermetallic, ceramic, and other materials by quench condensation of a high temperature vapor of the material. The apparatus can be used to make uncoated nanoparticles of the material, nanoparticles that are coated with another material such as graphite, oxide, carbide, nitride, or other protective or functional coatings, and nanoparticles that are converted by reaction from one material to another, such as from a metal to a compound of the metal such as a metal oxide, carbide, nitride, and the like.

The apparatus and method of the invention involve a two stage gaseous quenching jet and other features that provide much higher vapor quenching rates and therefore smaller particles sizes than is possible using traditional electric arc synthesis methods. Moreover, small particle size can be maintained at much higher evaporation rates than is possible with traditional evaporators.

Figure 1B:
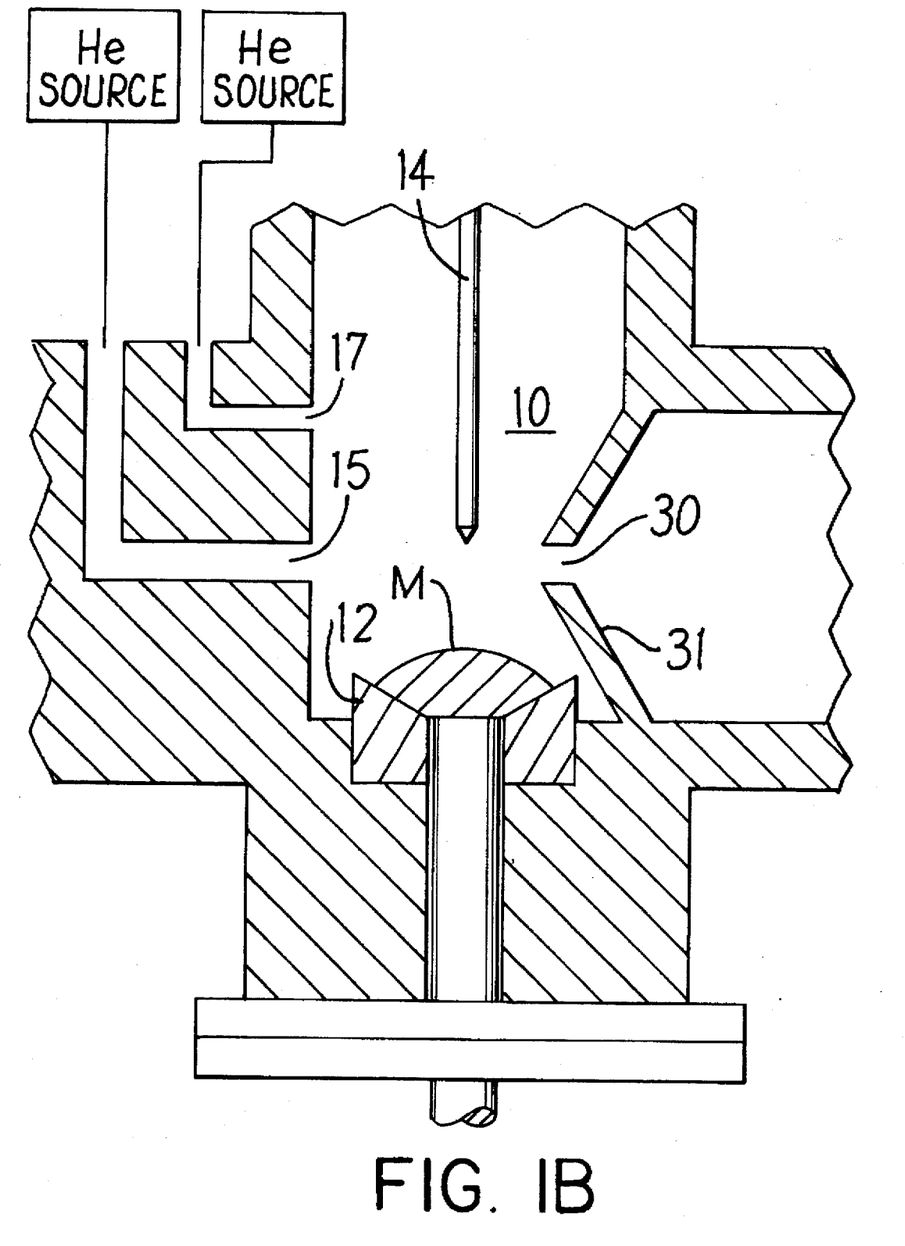
FIG. 1B is a schematic sectional view of the evaporation chamber showing an electric arc technique for forming a vapor plume.

Referring to FIGS. 1A and 1B, one apparatus embodiment is shown schematically as comprising a first chamber 10 for receiving the material to be heated and evaporated to form a vapor plume of high temperature in the chamber 10. The first chamber 10 thus constitutes an evaporation chamber in this embodiment. The material M to be evaporated typically is contained in a crucible 12 or other vessel disposed in the first chamber 10. The material in the crucible 12 can be heated to form a molten pool by electrical arc, resistance heating or other heating means in order to evaporate the material and generate the vapor plume thereof on the chamber 10. The chamber 10 can be evacuated by vacuum pump V.

When the material is melted and evaporated by electrical arc heating, a vertical tungsten rod 14 is used as a nonconsumable cathode and spaced from the material as an anode contained in the crucible 12. An electrical arc is established between the cathode and anode as described in abovementioned copending parent application Ser. No. 330 326, of common assignee herewith, the teachings of which are incorporated herein by reference. The electrical arc heating creates a plasma vapor plume of the material in the chamber 10. The material to be evaporated can be a block or shot of the material of interest (or other form of the material) and held in a graphite crucible, for example, in the event the nanoparticles are to be encapsulated in a graphite shell during formation as disclosed in aforementioned copending application Ser. No. 330 326. In a preferred embodiment, the material is separated from the graphite crucible by a few layers of graphite foil (not shown) to reduce heat loss.

When the material is evaporated by electrical resistance heating, conventional electrical resistance heating wires (not shown) can be disposed about the crucible 12 in a manner to heat the crucible to a temperature to evaporate the material therein. The invention is not limited to the electrical arc or resistance heating means and can be practiced using other heating means to evaporate the material in the crucible or vessel 10 so long a vapor plume or cloud is formed in the chamber 10 from which plume or cloud generally spherical nanoparticles are nucleated and grown to suitable nanosizes such as 100 nm or less in diameter, and more typically 50 nm or less in diameter.

When the material in the crucible 12 is heated by electrical arc or resistance heating, a gaseous atmosphere is provided within the evaporation chamber 10 and is non-reactive with the heating components, such as electrodes, and material being evaporated in the event the material is not to be reacted during formation into nanoparticles. Typical non-reactive gaseous atmospheres for use to this end are inert gas (e.g. He) or a reducing gas, such as hydrogen.

Pursuant to the invention, a non-reactive entrainment gas, such as an inert gas (e.g. He) or a neutral (e.g. $N_2$) or reducing gas (e.g. $H_2$) is introduced at room temperature into the chamber 10 from a suitable source means, such as a conventional gas bottle or cylinder, communicated to the chamber 10 at a gas inlet fitting 17. The entrainment gas is supplied to the chamber 10 at a controlled flow rate via a mass flow controller or other flow meter correlated with the flow rate of gaseous quenching gas through the vapor plume or cloud to prevent recirculation of gases between the first chamber 10 and a downstream chamber 20 in a manner to be described. The gaseous entrainment atmosphere also provides the non-reactive atmosphere in the first chamber 10 to protect the heating components, if necessary. The gas inlet fitting 17 may comprise a simple tube, a plurality of gas discharge apertures spaced circumferentially about a gas manifold (not shown) in the chamber 10, or other suitable gas inlet means.

A gaseous jet nozzle or other discharge device 15 is disposed in the chamber 10 to direct a gaseous quenching jet of inert (e.g. He) or neutral (e.g. $N_2$) or reducing gas (e.g. $H_2$) through the vapor plume or cloud to quench it so as to nucleate and grow nanoparticles from the vapor and carry them from the vapor plume or cloud in a manner to be described. The nozzle or other gaseous discharge device is disposed proximate a side of the crucible 12 and is aligned generally along the axis of flow restriction orifice or opening 30 that is disposed between the first chamber 10 and the second chamber 20 disposed on an opposite side of the crucible 10 as best shown in FIG. 1B. In other words, the nozzle or other device 15 is aligned along an axis A of chambers 10, 40. The second chamber 20 is communicated to the first chamber 10 via relatively smaller diameter intermedate chamber 40. The flow restriction orifice or opening 30 is defined by a closure membrane or wall 31 disposed across the chamber 40 so as to close off the intermediate chamber 40 to gas flow, except through the orifice 30.

The gaseous (e.g. He) quenching jet discharged from the nozzle or device 15 together with entrainment gas (e.g. He) introduced to chamber 10 through inlet fitting 17 rapidly quench the vapor so as to nucleate and grow nanosize particles therefrom. The velocity (flow rate) of the gaseous quenching jet controls the size of the particles formed from the vapor. For example, the size of the particles formed from the vapor in chamber 10 decreases as the velocity of the gaseous quenching jet increases as disclosed in aforementioned copending application Ser. No. 330 326. The gas for the gaseous quenching jet is supplied from a conventional bottle or cylinder with the flow rate thereof controlled by a suitable flow meter in order to vary velocity of the gaseous quenching jet. For example, He gas can be supplied to the nozzle or device 15 from a bottle or cylinder with flow rate controlled to this end.

The gaseous quenching jet in effect entrains a portion of the entrainment gas atmosphere (e.g. He atmosphere) introduced to the evaporation chamber 10 for quenching the vapor and also to carry the entrained nanoparticles as a hot aerosol stream or flow to the orifice 30. The aerosol stream or flow in the evaporation chamber 10 comprises a first stage of the gaseous jet containing the entrainment gas from chamber 10 and naonparticles formed from the vapor. The first stage of the gaseous jet is directed by the orientation and location of the nozzle or device 15 relative to the crucible 12 to flow in a direction to the flow restriction orifice 30. The relative orientation and location of the nozzle or device 15 and crucible 12 can be adjusted to this end.

The nozzle or other gaseous discharge device can be of any type, such as simple cylindrical tube nozzle, having an appropriate size and cross-sectional shape including circular, oval, rectangular and the like. The invention is not limited to any particular nozzle or device 15 for discharging the gaseous quenching jet through the vapor plume or cloud in the evaporation chamber 10.

Figure 1C:
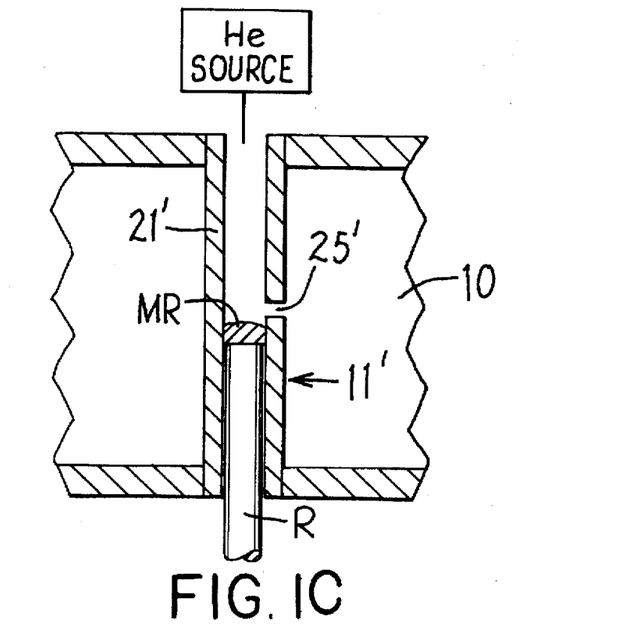
FIG. 1C is a schematic sectional view of the first chamber showing an evaporator therein for discharging a gaseous jet bearing a metal vapor to the first chamber.
Figure 1D:
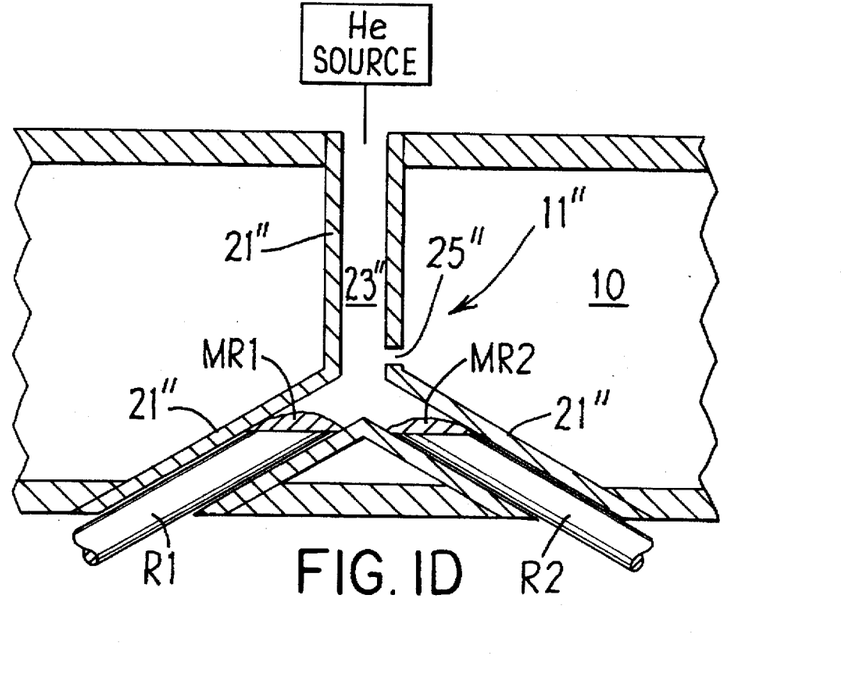
FIG. 1D is a schematic sectional view of the evaporation chamber showing another evaporator for discharging a gaseous jet bearing two metal vapors to the first chamber.

Referring to FIGS. 1C and 1D, alternative embodiments of the present invention are illustrated providing self-contained evaporators 11', 11" in the first chamber 10 for forming a gaseous jet and directing the gaseous jet carrying nanoparticles formed by quenching of a vapor plume in a direction in the first chamber 10 through the flow restriction orifice 30. The evaporators 11', 11" are described in copending patent application Ser. No. 08/557 206 entitled "EVAPORATOR APPARATUS AND METHOD FOR MAKING NANOPARTICLES" Ser. No. 08/557 206 filed Nov. 14, 1995, of common assignee herewith and the teachings of which are incorporated herein by reference with respect to details of the evaporators 11', 11". Briefly, in FIG. 1C, a metal rod R is fed to a tubular ceramic or graphite evaporation housing 21' which is resistance or otherwise heated to form a melt pool MR atop the rod R and a resulting vapor plume in evaporation chamber 23'. A carrier gas (e.g. He) is supplied to the upper end of the tubular housing 21' to sweep the metal vapor in chamber 23' through the discharge opening 25' as a gaseous jet into the chamber 10 having the entrainment gas therein and directed to flow through the flow restriction orifice 30.

In FIG. 1D, two metal rods R1, R2 are fed to the tubular evaporation housing 21" which is resistance or otherwise heated to form a respective melt pool MR1 and MR2 atop the rods R1 and R2 and a resulting vapor plume in evaporation chamber 23" wherein the vapor plume comprises controlled proportions of the two metal vapors of rods R1 and R2. The He carrier gas is supplied to the upper end of the tubular housing 21" to sweep the metal vapors in chamber 23" through the discharge opening 25" as a gaseous jet into the chamber 10 having the entrainment gas therein and directed to flow through the flow restriction orifice 30.

The evaporators 11', 11" of FIGS. 1C and 1D can be used in lieu of the crucible 12 and nozzle 15 shown in FIGS. 1A, 1B to discharge the gaseous quenching jet via opening 25', 25" into the chamber 10 to entrain the entrainment gas therein and then flow as a first stage of the gaseous jet in a direction through the flow restriction orifice 30. The metal vapor(s) is/are quenched by the gaseous He jet discharged through opening 25', 25" and by entrainment gas in chamber 10 entrained in the gaseous jet to form nanoparticles in the manner described hereabove.

As mentioned, the first stage of the gaseous jet in chamber 10 flows to the flow restriction orifice 30 separating the first and second chambers 10, 20. By appropriate adjustment of the flow rate of the gaseous quenching jet and the flow rate of the entrainment gas in the first chamber 10 for a given size and location of orifice or opening 30, the first stage of the gaseous jet so formed can be flowed from the first chamber 10 through the flow restriction orifice or opening 30 in the intermediate chamber 40 without substantial recirculation back to the first chamber 10. In effect, the flow rates of the quenching jet and entrainment gas into the first chamber 10 are controlled and flowed through orifice or opening 30 to provide a second stage of the gaseous jet downstream of the orifice, the second stage of the gaseous jet being substantially isolated from the first chamber 10 for flow to the downstream second chamber 20. The second stage of the gaseous quenching jet thus comprises a diluted aerosol comprising the aforementioned gaseous quenching jet (e.g. He jet) diluted with an entrained portion of the entrainment gas (He gaseous atmosphere) in chamber 10 and the entrained nanoparticles formed from the vapor plume.

Figure 2A:
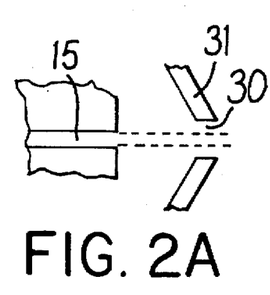
FIG. 2A, 2B, and 2C are schematic views of flow restriction orifice relative to a gaseous jet nozzle.
Figure 2B:
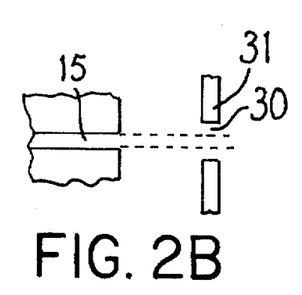
Figure 2C:
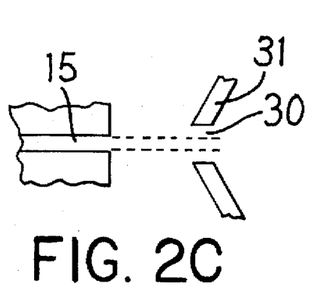

Referring to FIGS. 2A, 2B, and 2C, different configurations of the closure member 31 defining the orifice or opening 30 and relative orientation to the nozzle or device 15 are shown schematically for purposes of illustration and not limitation.

Referring to FIG. 1A, the first evaporation chamber 10 is communicated to the downstream second chamber 20 by the intermediate chamber 40. The second chamber 20 may comprise a primary particle collection chamber for collecting the nanoparticles from the second stage of the hot gaseous jet or aerosol flowing downstream of the orifice 30. In this event, the second collection chamber 20 can be provided with one or more vertically oriented, cooled (liquid nitrogen cooled) walls that function to achieve collection of the nanoparticles by the known thermophoresis effect wherein particles suspended in a hot aerosol are driven to the cooled walls. The magnitude of the thermophoresis forces causing particle accumulation on the cooled walls can be controlled by controlling the temperature of the walls of the second chamber 20. A liquid nitrogen or other cooling jacket (not shown) can be provided about the wall to this end. Thus, the amount or fraction of nanoparticles in the second stage of the gaseous jet flowing downstream of the orifice 30 collected on the chamber walls can be controlled by control of the wall temperature.

In the event the nanoparticles entrained in the second stage of the gaseous quenching jet are to be used without further treatment or processing, such as coating and the like, the temperature of the wall of the second collection chamber 20 can be controlled to collect a large fraction of the nanoparticles present in the second stage of the jet on the walls of the chamber 20. The collected nanoparticles can be removed from the wall manually or by suitable means such as a scraper mechanism (not shown) that moves along the inner surface of the wall inside the chamber 20 and dislodges the nanoaparticles therefrom. The dislodged nanoparticles fall by gravity through a funnel shaped region 20a of the chamber 20 through gate valves 23, 25 into a particle receptable or can 27. Valves 23, 25 and a vacuum pumping port 29 are provided so that the receptacle 27 can be sealed, evacuated if desired, and removed for recovery of the nanoparticles therein without disturbing operation of the system; i.e. without interrupting continued production and collection of nanoparticles on the cooled walls of the second chamber 20.

Figure 4:
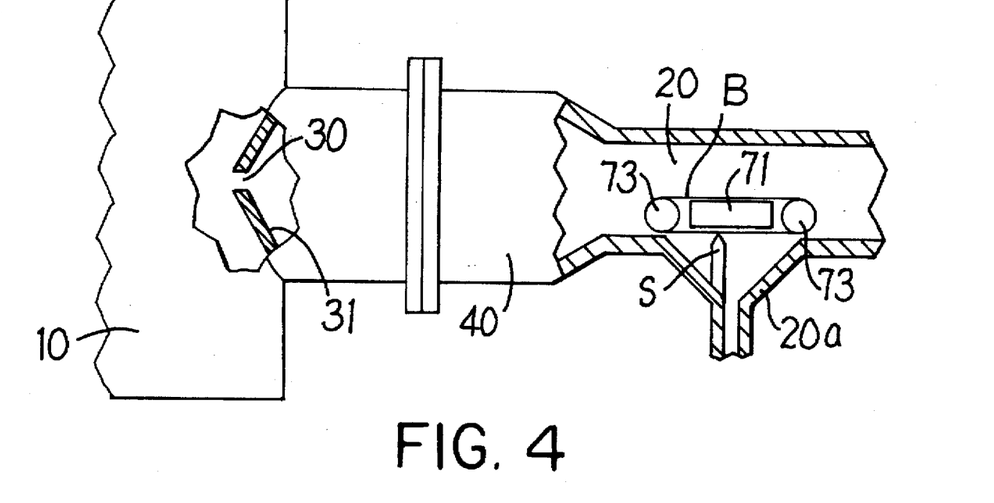
FIG. 4 is a schematic illustration of the first chamber, flow restriction orifice and nanoparticle collection chamber having an endless nanoparticle collection belt.
Figure 5:
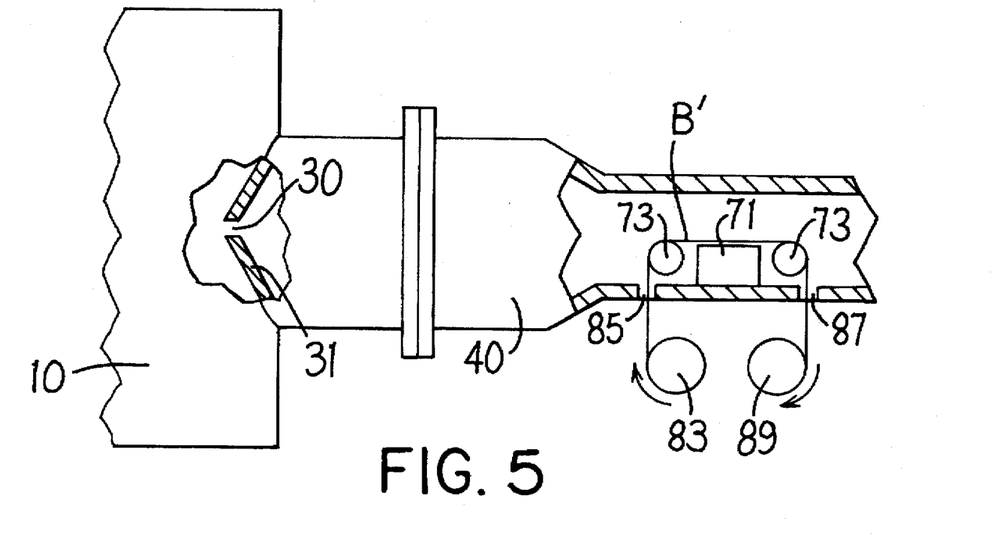
FIG. 5 is a schematic illustration of the first chamber, flow restriction orifice and nanoparticle collection chamber having a nanoparticle collection belt that enters and exits the collection chamber with nanoparticles collected and adhered on the belt.

The particle size and particle production rate will depend on various parameters including the temperature of the molten pool from which the material evaporates in the first chamber 10, the velocity, mass flow, and cross-sectional area and shape of the gaseous quenching jet, the mass flow of the entrainment gas atmosphere introduced to the first chamber 10, the size (e.g. diameter) and position of the orifice 30 determining the position of the second stage of the gaseous jet, and the overall pressure in the system. In general, lower pressure, higher quenching jet velocity and higher entrainment gas flow rate result in smaller particles. Production rate depends on the temperature of the molten pool of material in the crucible 12 since this governs the evaporation rate of the material. As an example only, an overall system He gas pressure of 200 torr, a quenching He jet velocity of 100 meters/second, an entrainment He gas flow rate of 100 cubic centimeters/second (at standard temperature and pressure) and an electrical arc power of 2.1 kilowatts (current of 70 amperes and DC volts of 30) can produce about 3 grams per hour of generally spherical nanoparticles comprising nickel having an average diameter of about 10 nm (using an orifice diameter of 35 mm at a location in chamber 40 about 1.5 inches from the centerline of the crucible 12). Referring to FIGS. 4 and 5, alternative nanoparticle collection means is shown. In FIG. 4, an endless belt B is disposed in an elongated collection chamber 20 and is cooled by contact with a cooling means 71 such as a water cooled metal chill block. The belt B can comprise metal, polymer or other material and is driven on pulleys or rollers 73 by a suitable pulley motor (not shown). Nanoparticles in the second stage of the jet downstream of the flow restriction orifice 30 collect on the cooled belt B by the thermophoresis effect. The collected nanoparticles are dislodged or removed from the belt B by a scraper S as the belt B moves therepast so that the nanoparticles fall by gravity to a funnel shaped region 20a of the collection chamber for collection in a suitable receptable which can be similar to receptable 27 shown in FIG. 1A.

In FIG. 5, a belt B' is fed externally from a pay-off reel 83 into collection chamber 20 through a sealed opening 85 onto the aforementioned rollers 73 and into contact with the aforementioned cooling means 71 like that described with respect to FIG. 4 to collect nanoparticles thereon by the thermopheresis effect. The belt can be heated by a suitable belt heater disposed inside or outside chamber 20 after the particles are collected to incorporate the particles onto the heat softened outer belt surface. The belt B' exits the chamber collection 20 through a sealed exit opening 87 and is coiled on storage reel 89 disposed outside the collection chamber 20. The coiled belt B' can be made of a suitable substrate material, such as a polymeric material, that comprises the substrate of an end product (e.g. magnetic tape). In this way, the coiled belt B' on reel 89 can be further processed such as by cutting to form a final end tape product without the need to apply nanoparticles thereto. That is, the belt B' already includes the nanoparticles adhered thereto and merely requires configuring to desired shape and/or size for the end product desired (e.g. the nanoparticles can comprise a magnetic material and the belt can comprise a polymeric material to form coiled bulk recording tape that can be cut to desired final dimensions for an end magnetic tape product).

In the event the nanoparticles are to be further treated prior to use, the apparatus includes an aerosol treatment chamber 50 downstream from the second chamber 20 and communicated thereto as shown in FIG. 1A for receiving at least a portion of the second stage of the gaseous quenching jet. One or more treating agents such as reactants, such as for example, oxygen, carbon monoxide, borane, and or other reactive gas or material, may be introduced to the aerosol treatment chamber 50 through the inlet 50a to treat or react with the nanoparticles in their flight through the chamber 50 to form a coating or other reaction product. Alternately, chemcial vapor deposition or other deposition processes may be effected in the chamber 50 to coat or react the particles. The reaction conditions in the aeorsol treatment chamber 50, in effect, are isolated from the evaporation conditions present in the first chamber 10 as a result of isolation of the second stage of the gaseous jet from the first chamber 10. The reaction of the nanoparticles thus can be carried out independent of and without substantially affecting the conditions present in the evaporation chamber. For example, an oxidizing gas can be introduced into the aerosol treatment chamber 50 to react with the nanoparticles reheated in chamber 50 to form oxide nanoparticles while inert or reducing gas conditions are maintained in the evaporation chamber 10. Reheating of the nanoparticles in chamber 50 can be achieved by a furnace 51.

The fraction or portion of the second stage of the gaseous jet that enters the aerosol treatment chamber 50 from the second chamber 20 can be controlled by appropriate positioning (e.g. depth) of an adjustable outlet conduit or snorkel 52 extending into the second chamber 20 and by the temperature of the walls of the second chamber 20. For example, a higher wall temperature will result in less thermophoresis collection in the second chamber 20 and a greater fraction of the second stage of the gaseous jet entering the aerosol treatment chamber 50.

A secondary nanoparticle collection chamber 60 typically is provided downstream from the aerosol treatment chamber 50 in communication therewith via a conduit 60 a to collect treated or untreated nanoparticles. This collection chamber 60 can be similar to the second chamber 20 described hereabove and include one or more cooled collection walls to collect nanoparticles by the thermophoresis effect as described hereabove for the walls of the second chamber 20 as well as similar gate valves 63, 65 and vacuum port 69 that permit the nanoparticle receptacle 67 to be sealed, evacuated if desired, and removed for recovery of the treated nanoparticles therein without disturbing operation of the system.

Figure 3:
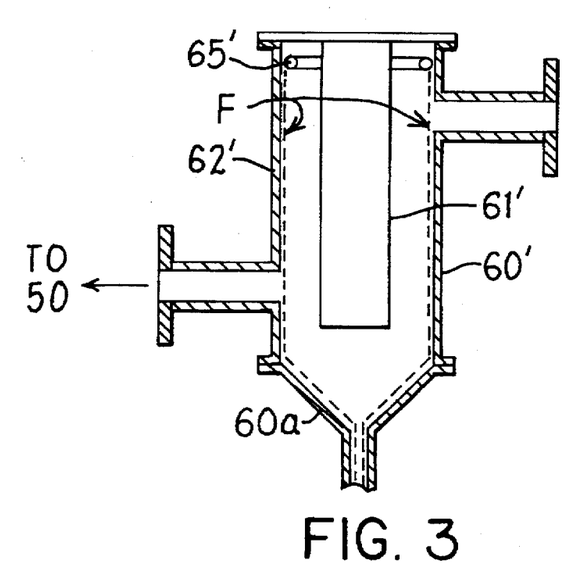
FIG. 3 is a schematic view of a nanoparticle collection chamber of an embodiment of the invention using a fluid film to remove nanoparticles from a cooled chamber wall.

Referring to FIG. 3, an alternative secondary collection chamber 60' is shown (wherein like reference numerals are used for like features of FIG. 1A) including an interior hollow cylindrical wall 61' that can be cooled by liquid nitrogen pumped therein while the exterior cylindrical wall 62' is warmed or heated to a higher temperature to effect nanoparticle collection on the interior wall 61'. Or, the exterior cylindrical wall 62' can be maintained at a lower temperature while the interior cylindrical wall 61' is heated to a higher temperature to effect nanoparticle collection on the exterior wall 62'.

The secondary collection chamber 60' additionally can include fluid collection means 65', such as an annular fluid manifold as shown, for discharging a fluid flow curtain or film F descending along the cooled wall where the nanoparticles are collected (shown as cooled exterior wall 62' in FIG. 3). The fluid curtain or film may comprise water or other suitable fluid and functions to sweep collected nanoparticles through a funnel shaped region 60a' of the chamber 60' through gate valves into a particle receptable or can like that shown in FIG. 1A. The fluid may be recirculated through the manifold to create a slurry of nanoparticles in the bottom of the chamber 60.

In the practice of the present invention, production of treated nanoparticles is achieved using a two-stage gaseous quenching jet system that, in effect, isolates the upstream chamber 10 from one or more downtream treatment and collection chambers where the nanoparticles can be reacted (e.g. coated) or otherwise treated in flight under a variety of reaction conditions without substantially affecting the evaporation conditions present in the upstream chamber. Further, the invention can provide for nanoparticle collection in fluids, if desired.

Although particular embodiments of the invention have been described in detail for purposes of illustrating the invention, it will be understood that variations and modifications can be made therein within the scope of the invention as set forth in the appended claims.

We claim:

1. Method of making nanoparticles of a material, comprising directing a gaseous jet in a first chamber in a direction to carry nanoparticles through a flow restriction orifice between said first chamber and a second chamber downstream of said first chamber in a manner to provide a second stage of said gaseous jet downstream of said orifice and substantially isolated from said first chamber for flow to said second chamber, and collecting said nanoparticles from said second stage of said gaseous jet downstream from said orifice.

2. Method of making nanoparticles of a material, comprising directing a gaseous jet in a first chamber in a direction to carry nanoparticles through a flow restriction orifice between said first chamber and a second chamber downstream of said first chamber, introducing an entrainment gaseous atmosphere to said first chamber, substantially avoiding recirculation of said gaseous jet and nanoparticles entrained therein from said second chamber to said first chamber effective to thereby provide a second stage of said gaseous jet downstream of said orifice and substantially isolated from said first chamber for flow to said second chamber, and collecting said nanoparticles from said second stage of said gaseous jet downstream from said orifice.

3. The method of claim 1 wherein said gaseous jet is directed proximate a side of a container of said material being evaporated in said first chamber in a direction toward said orifice disposed on an opposite side of said container.

4. The method of claim 1 wherein said gaseous jet is directed from an evaporator housing disposed in the first chamber and communicated thereto by a gaseous jet discharge opening.

5. The method of claim 1 wherein a flow rate of an entrainment gaseous atmosphere to said first chamber and a flow rate of said gaseous jet to said first chamber are controlled to substantially prevent recirculation of said gaseous jet and nanoparticle entrained therein from said second chamber back to said first chamber through said orifice.

6. The method of claim 1 wherein said nanoparticles are collected from said second stage of said gaseous jet on a cooled wall of said second chamber.

7. The method of claim 6 including removing said nanoparticles from said cooled wall.

8. The method of claim 1 wherein said nanoparticles are collected from said second stage of said gaseous jet on a moving belt.

9. The method of claim 8 wherein the nanoparticles are removed from the moving belt in said second chamber.

10. The method of claim 8 wherein the nanoparticles are adhered to the moving belt and said belt is moved external of said second chamber.

11. The method of claim 10 including configuring said belt having the nanoparticles thereon to a configuration for an end product.

12. The method of claim 1 further comprising reacting the nanoparticles in the second stage of said gaseous jet with a reactant in a reactor chamber located downstream from said second chamber.

13. The method of claim 12 wherein said reactant is an oxidizing reactant.

14. The method of claim 12 further comprising controlling wall temperature of said second chamber for controlling a fraction of said second stage of said gaseous jet entering said reactor.

15. The method of claim 12 further comprising collecting reacted nanoparticles on a cooled wall of a secondary collection chamber.

16. The method of claim 15 wherein said reacted nanoparticles are collected on an interior wall having a lower temperature than an exterior wall.

17. The method of claim 15 wherein said reacted nanoparticles are collected on an exterior wall having a cooler temperature than an interior wall.

18. The method of claim 15 further including flowing a fluid film along the cooled wall to remove reacted nanoparticles therefrom.

19. Apparatus for forming nanoparticles of a material, comprising means in a first chamber for directing a gaseous jet in a direction to carry nanoparticles through a flow restriction orifice between said first chamber and a second chamber downstream of said first chamber in a manner to provide a second stage of said gaseous jet downstream of said orifice and substantially isolated from said first chamber for flow to said second chamber, and means downstream from said orifice for collecting said nanoparticles from said second stage of said gaseous jet.

20. Apparatus for forming nanoparticles of a material, comprising means in a first chamber for directing a gaseous jet in a direction to carry nanoparticles through a flow restriction orifice between said first chamber and a second chamber downstream of said first chamber, means for introducing an entrainment gaseous atmosphere to said first chamber, and means for controlling flow rates of said entrainment gaseous atmosphere and said gaseous jet in a manner that substantially avoids recirculation of said gaseous jet and nanoparticles entrained therein from said second chamber to said first chamber to provide a second stage of said gaseous jet downstream of said orifice and substantially isolated from said first chamber for flow to said second chamber, and means downstream from said orifice for collecting said nanoparticles from said second stage of said gaseous jet.

21. The apparatus of claim 19 wherein said means for directing said gaseous jet comprises a gas nozzle disposed on a side of a container of said material being evaporated in said first chamber and aligned generally along an axis of said orifice disposed on an opposite side of said container.

22. The apparatus of claim 19 wherein said means for directing said gaseous jet comprises an evaporator housing disposed in the first chamber and communicated thereto by a gaseous jet discharge opening.

23. The apparatus of claim 19 wherein said first and second chambers are communicated by an intermediate chamber therebetween and said flow restriction orifice is disposed in said intermediate chamber.

24. The apparatus of claim 23 wherein said flow restriction orifice is disposed in a closure member in said intermediate chamber.

25. The apparatus of claim 19 wherein said second chamber includes means for collecting the nanoparticles entrained in the second stage of said gaseous jet.

26. The apparatus of claim 25 wherein said means for collecting said nanoparticles comprises a cooled wall forming said second chamber.

27. The apparatus of claim 26 further comprising means for removing the collected nanoparticles from said cooled wall of said second chamber and a receptacle for receiving said nanoparticles.

28. The apparatus of claim 25 wherein said means for collecting said nanoparticles comprises a moving belt disposed in said second chamber and means for cooling said belt.

29. The apparatus of claim 28 wherein said belt is an endless belt disposed in said second chamber.

30. The apparatus of claim 28 wherein said belt is fed to said second chamber from a pay-off reel disposed outside said second chamber and is coiled on a storage reel disposed outside said second chamber.

31. The apparatus of claim 19 further comprising a reactor chamber downstream from said second chamber and communicated thereto for receiving at least a portion of the second stage of said gaseous jet and means for providing a reactant in said reactor chamber.

32. The apparatus of claim 31 wherein said reactant is an oxidizing reactant.

33. The apparatus of claim 31 further comprising a conduit extending into said second chamber in adjustable manner and means for controlling wall temperature of said second chamber for controlling a fraction of said second stage of said gaseous jet entering said reactor from said second chamber.

34. The apparatus of claim 31 further comprising a secondary collection chamber communicated to said reactor chamber and having a cooled wall for collecting reacted nanoparticles thereon.

35. The apparatus of claim 34 wherein said secondary collection chamber includes a cooled interior wall at a lower temperature than an exterior so as to collect nanoparticles on said interior wall.

36. The apparatus of claim 34 wherein said secondary collection chamber includes a cooled exterior wall at a lower temperature than an interior wall to collect nanoparticles on said exterior wall.

37. The apparatus of claim 19 further including means for providing a fluid film along said cooled wall to remove reacted nanoparticles from said cooler wall.

* * * * *